United States Patent
Gummadi et al.

(10) Patent No.: US 10,481,700 B1
(45) Date of Patent: Nov. 19, 2019

(54) FRAME RATE SETTING FOR POWER EFFICIENT GESTURE DETECTION

(71) Applicant: QUALCOMM Incorporated, San Diego, CA (US)

(72) Inventors: Bapineedu Chowdary Gummadi, Hyderabad (IN); Soman Ganesh Nikhara, Hyderabad (IN); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/014,054

(22) Filed: Jun. 21, 2018

(51) Int. Cl.
  *G06F 3/01* (2006.01)
  *G06K 9/00* (2006.01)

(52) U.S. Cl.
  CPC ......... *G06F 3/017* (2013.01); *G06K 9/00335* (2013.01)

(58) Field of Classification Search
  CPC ................ G06F 3/017; G06F 2203/01; G06F 2203/011; G06K 9/00335
  See application file for complete search history.

(56) References Cited

U.S. PATENT DOCUMENTS

| | | | | |
|---|---|---|---|---|
| 2013/0194287 | A1* | 8/2013 | Nicholson | G09G 5/36 345/547 |
| 2014/0253701 | A1* | 9/2014 | Wexler | A61F 9/08 348/62 |
| 2014/0376773 | A1* | 12/2014 | Holz | G06F 1/1686 382/103 |
| 2015/0317516 | A1* | 11/2015 | Tsoref | G06K 9/00335 382/103 |
| 2018/0329501 | A1* | 11/2018 | Marchenko | G06T 7/215 |

* cited by examiner

*Primary Examiner* — Sardis F Azongha
(74) *Attorney, Agent, or Firm* — Holland & Hart LLP

(57) ABSTRACT

Methods, systems, and devices for gesture detection are described. A device may identify a set of configured gestures and determine a set of minimum frame rates, where each minimum frame rate may correspond to at least one configured gesture in the set of configured gestures. The device may set an initial frame rate for a sensor based at least in part on the set of minimum frame rates. For example, the device may identify a maximum frame rate of the set of minimum frame rates and set the initial frame rate to be equal to or greater than the maximum frame rate. The device may capture a set of images using an initial frame rate and detect a configured gesture of the set of configured gestures based on the set of images.

20 Claims, 10 Drawing Sheets

FRAME RATE SETTING FOR POWER EFFICIENT GESTURE DETECTION

BACKGROUND

The following relates generally to gesture detection operations, and more specifically to frame rate adjustment for gesture detection.

Some devices may support interactions with a user or environment where these interactions depend on stimuli (e.g., gestures, environmental conditions) in addition to or instead of more conventional input methods (e.g., user interfaces such as touch screens, timer-based inputs). For example, a device may switch applications based on a swiping gesture, may increase the volume of an output based on an ear-cupping motion, may decrease a screen brightness based on a squinting motion, etc. Such gestures may rely on one or more sensors (e.g., cameras, infrared sensors) integrated with the device. These sensors may consume power monitoring for gestures. Improved techniques for power-efficient gesture detection may be desired.

SUMMARY

The described techniques relate to improved methods, systems, devices, and apparatuses that support frame rate adjustment for gesture detection. Generally, the described techniques provide for power-efficient gesture detection operations. For example, gestures may initially be trained in a system, and these gestures may be used to perform a certain action upon detection. In some examples, systematic gesture sequence classification may be used (e.g., which may help avoid continuous gesture processing by breaking a gesture into a series of objects).

In accordance with aspects of the present disclosure, the frame rate for one or more sensors of a device may be based on (e.g., dynamically, semi statically) the configured gestures and the gesture state. For example, each of the configured gestures may include one or more gesture objects, and each gesture object may require a certain frame rate for detection. By dynamically selecting the frame rate based on the active potential gesture objects (e.g., the gesture state), a device may avoid using unnecessarily high frame rates (e.g., leading to increased power usage) or unnecessarily low frame rates (e.g., leading to inaccurate gesture detection).

A method of gesture detection at a device is described. The method may include identifying a set of configured gestures, determining a set of minimum frame rates, where each minimum frame rate corresponds to at least one configured gesture in the set of configured gestures, setting an initial frame rate for a sensor of the device based on the set of minimum frame rates, capturing a set of images using the initial frame rate, and detecting a configured gesture of the set of configured gestures based on the set of images.

An apparatus for gesture detection is described. The apparatus may include a processor, memory in electronic communication with the processor, and instructions stored in the memory. The instructions may be executable by the processor to cause the apparatus to identify a set of configured gestures, determine a set of minimum frame rates, where each minimum frame rate corresponds to at least one configured gesture in the set of configured gestures, set an initial frame rate for a sensor of the apparatus based on the set of minimum frame rates, capture a set of images using the initial frame rate, and detect a configured gesture of the set of configured gestures based on the set of images.

Another apparatus for gesture detection is described. The apparatus may include means for identifying a set of configured gestures, determining a set of minimum frame rates, where each minimum frame rate corresponds to at least one configured gesture in the set of configured gestures, setting an initial frame rate for a sensor of the apparatus based on the set of minimum frame rates, capturing a set of images using the initial frame rate, and detecting a configured gesture of the set of configured gestures based on the set of images.

A non-transitory computer-readable medium storing code for gesture detection at a device is described. The code may include instructions executable by a processor to identify a set of configured gestures, determine a set of minimum frame rates, where each minimum frame rate corresponds to at least one configured gesture in the set of configured gestures, set an initial frame rate for a sensor of the device based on the set of minimum frame rates, capture a set of images using the initial frame rate, and detect a configured gesture of the set of configured gestures based on the set of images.

Some examples of the method, apparatuses, and non-transitory computer-readable medium described herein may further include operations, features, means, or instructions for determining a maximum frame rate from the set of minimum frame rates, where setting the initial frame rate includes setting the initial frame rate to be greater than or equal to the maximum frame rate.

Some examples of the method, apparatuses, and non-transitory computer-readable medium described herein may further include operations, features, means, or instructions for detecting a first gesture object based on the set of images, identifying a subset of the set of configured gestures that share the first gesture object, determining a second set of minimum frame rates that correspond to second gesture objects of the subset of the set of configured gestures, setting a second frame rate for the sensor of the device based on the second set of minimum frame rates and capturing a second set of images using the second frame rate, where detecting the configured gesture may be based on the second set of images.

Some examples of the method, apparatuses, and non-transitory computer-readable medium described herein may further include operations, features, means, or instructions for detecting a first gesture object based on the set of images, identifying a unique gesture of the set of configured gestures that includes the first gesture object, determining a second minimum frame rate that corresponds to a second gesture object of the unique gesture, setting a second frame rate for the sensor of the device based on the second minimum frame rate and capturing a second set of images using the second frame rate, where detecting the configured gesture may be based on the second set of images.

Some examples of the method, apparatuses, and non-transitory computer-readable medium described herein may further include operations, features, means, or instructions for estimating one or more characteristics of a second gesture object corresponding to the unique gesture, where the one or more characteristics include an object size of the second gesture object, an object position of the second gesture object, or both, identifying a portion of each of the second set of images based on the one or more characteristics of the second gesture object and identifying a presence of the second gesture object in at least one of the second set of images by analyzing the portion of the at least one of the second set of images, where detecting the configured gesture may be based on the presence of the second gesture object.

In some examples of the method, apparatuses, and non-transitory computer-readable medium described herein, identifying the set of configured gestures may include operations, features, means, or instructions for receiving one or more training images for each gesture of the set of configured gestures and identifying respective gesture objects for each gesture based on the corresponding one or more training images.

Some examples of the method, apparatuses, and non-transitory computer-readable medium described herein may further include operations, features, means, or instructions for updating an operational parameter of the device based on detecting the configured gesture.

In some examples of the method, apparatuses, and non-transitory computer-readable medium described herein, updating the operational parameter may include operations, features, means, or instructions for unlocking the device based on detecting the configured gesture, providing an input for a processor of the device based on detecting the configured gesture, or both.

DETAILED DESCRIPTION

Some devices may be able to interact with their environment based on visual stimuli. By way of example, devices may detect movement (e.g., hand movement, movement of an object in frames of a video) and perform an operation based on the detected movement. In some examples, a device may be configured to recognize multiple gestures, where each gesture is associated with a respective device operation (e.g., brightness change, volume adjustment, sensor rotation). Each gesture (e.g., or a subset of the gestures) may include multiple components (e.g., as described with reference to FIG. 2).

Aspects of the present disclosure relate to selecting an appropriate frame rate for detecting such gestures. For example, a device operating in accordance with the described techniques may select a frame rate for one or more sensors based on the components of the different gestures. Different gesture components may require or be associated with different frame rates for detection. By way of example, the frame rate associated with detection of an eye blink may be higher than the frame rate associated with detection of a hand wave. A device may select the frame rate for one or more sensors based on an active set of gestures (e.g., a set of gestures sharing any previously detected gesture components) and may dynamically adjust the frame rate based on any updates to the gesture state. By dynamically selecting the frame rate based on the active potential gesture objects (e.g., the gesture state), a device may avoid using unnecessarily high frame rates (e.g., leading to increased power usage) or unnecessarily low frame rates (e.g., leading to inaccurate gesture detection)

Aspects of the disclosure are initially described in the context of a wireless communications system. Aspects of the disclosure are then illustrated by and described with reference to a multi-component gesture, a timing diagram, and a process flow. Aspects of the disclosure are further illustrated by and described with reference to apparatus diagrams, system diagrams, and flowcharts that relate to frame rate adjustment for gesture detection.

Figure 1:
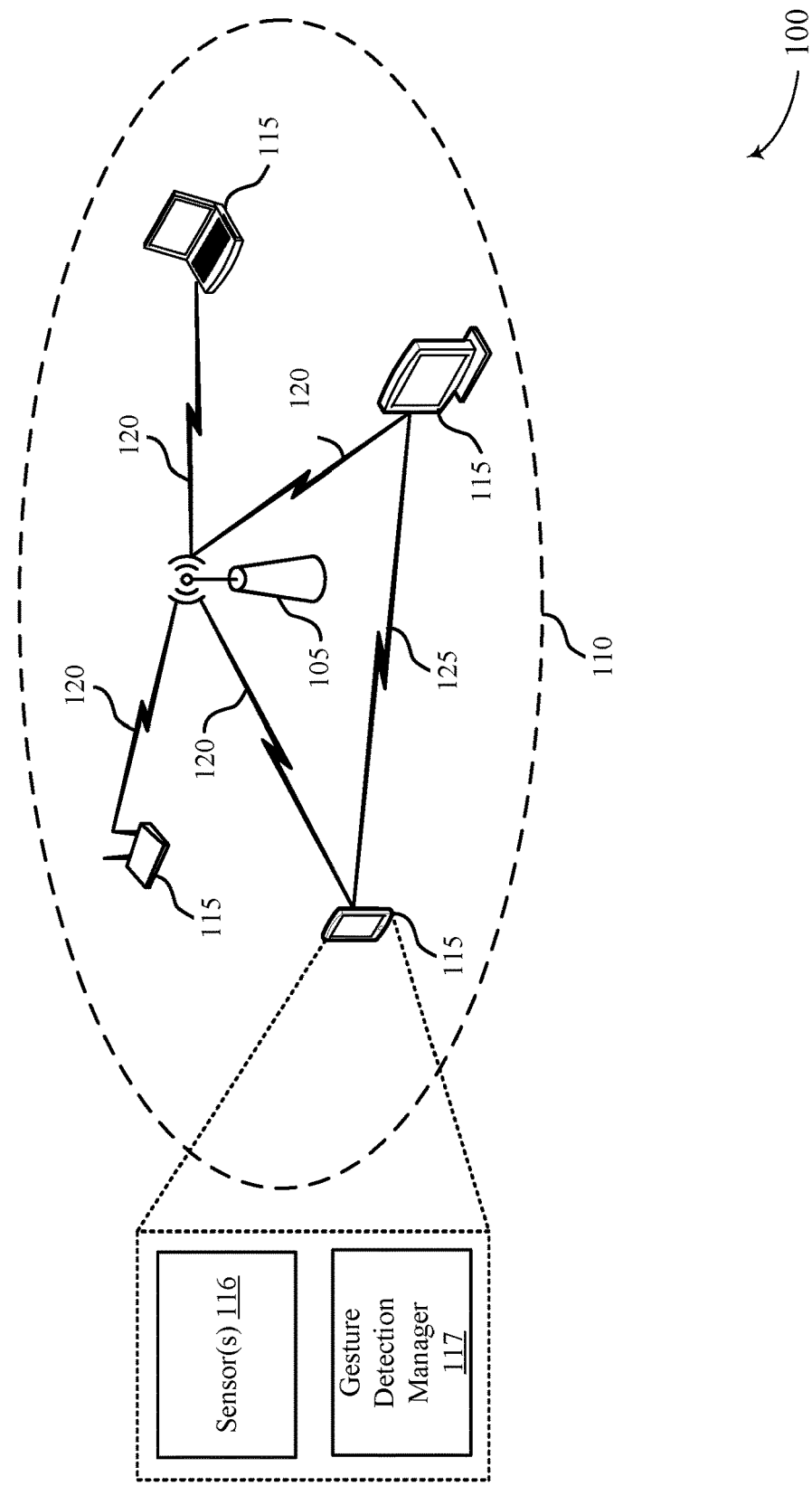
FIG. 1 illustrates an example of a system that supports frame rate adjustment for gesture detection in accordance with aspects of the present disclosure.

FIG. 1 illustrates an example of a wireless communications system 100 that supports frame rate adjustment for gesture detection in accordance with aspects of the present disclosure. The wireless communications system 100 may include an access point (AP) 105 and multiple associated user equipment (UEs) 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a PDA, a tablet computer, a laptop computer, or a personal computer. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

APs 105 may wirelessly communicate with UEs 115 via one or more AP antennas. APs 105 described herein may include or may be referred to by those skilled in the art as a base transceiver station, a radio base station, a base station, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include APs 105 of different types (e.g., macro or small cell base stations). The UEs 115 described herein may be able to communicate with various types of APs 105 and network equipment including macro eNBs, small cell eNBs, gNBs, relay base stations, and the like.

In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may be a wireless local area network (WLAN). UEs 115 and APs 105 may communicate according to the wireless local area network (WLAN) radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, 802.11az, 802.11ba, etc. In other implementations, peer-to-peer connections or ad hoc networks may be implemented within wireless communications system 100.

The AP 105 and the associated UEs 115 may represent a basic service set (BSS) or an extended service set (ESS). The various UEs 115 in the network are able to communicate with one another through the AP 105. Also shown is a coverage area 110 of the AP 105, which may represent a basic service area (BSA), a cell, or the like of the wireless communication system 100. An extended network station associated with the wireless communications system 100 may be connected to a wired or wireless distribution system that may allow multiple APs 105 to be connected in an ESS.

In some examples, a UE 115 may be located in the intersection of more than one coverage area 110 and may associate with more than one AP 105. A single AP 105 and an associated set of UEs 115 may be referred to as a BSS. An ESS is a set of connected BSSs. A distribution system may be used to connect APs 105 in an ESS. In some cases, the coverage area 110 of an AP 105 may be divided into sectors. The wireless communications system 100 may include APs 105 of different types (e.g., metropolitan area, home network, etc.), with varying and overlapping coverage areas 110. Two (or more) UEs 115 may also communicate directly via a direct wireless link 125 regardless of whether both UEs 115 are in the same coverage area 110. Examples of direct wireless links 120 may include Wi-Fi Direct connections, Wi-Fi Tunneled Direct Link Setup (TDLS) links, and other group connections.

Devices in wireless communications system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. Devices in wireless communications system 100 may additionally or alternatively communicate over shared spectrum and/or licensed spectrum.

In accordance with aspects of the present disclosure, UEs 115 may include one or more sensors 116 and a gesture detection manager 117 (e.g., which may be an example of the corresponding component described with reference to FIGS. 5 and 6). Sensor(s) 116 may include or be an example of a digital imaging sensor for capturing media (e.g., taking photos and/or video), may include or be an infrared sensor, may refer to an array of sensors, etc. Gesture detection manager 117 may control a frame rate for the one or more sensors 116 based on one or more factors, including but not limited to a gesture state and/or a set of configured gestures. This control of the frame rate of sensors 116 may improve a battery life of a UE 115 or provide other benefits (e.g., improved processing capabilities and the like).

Figure 2:
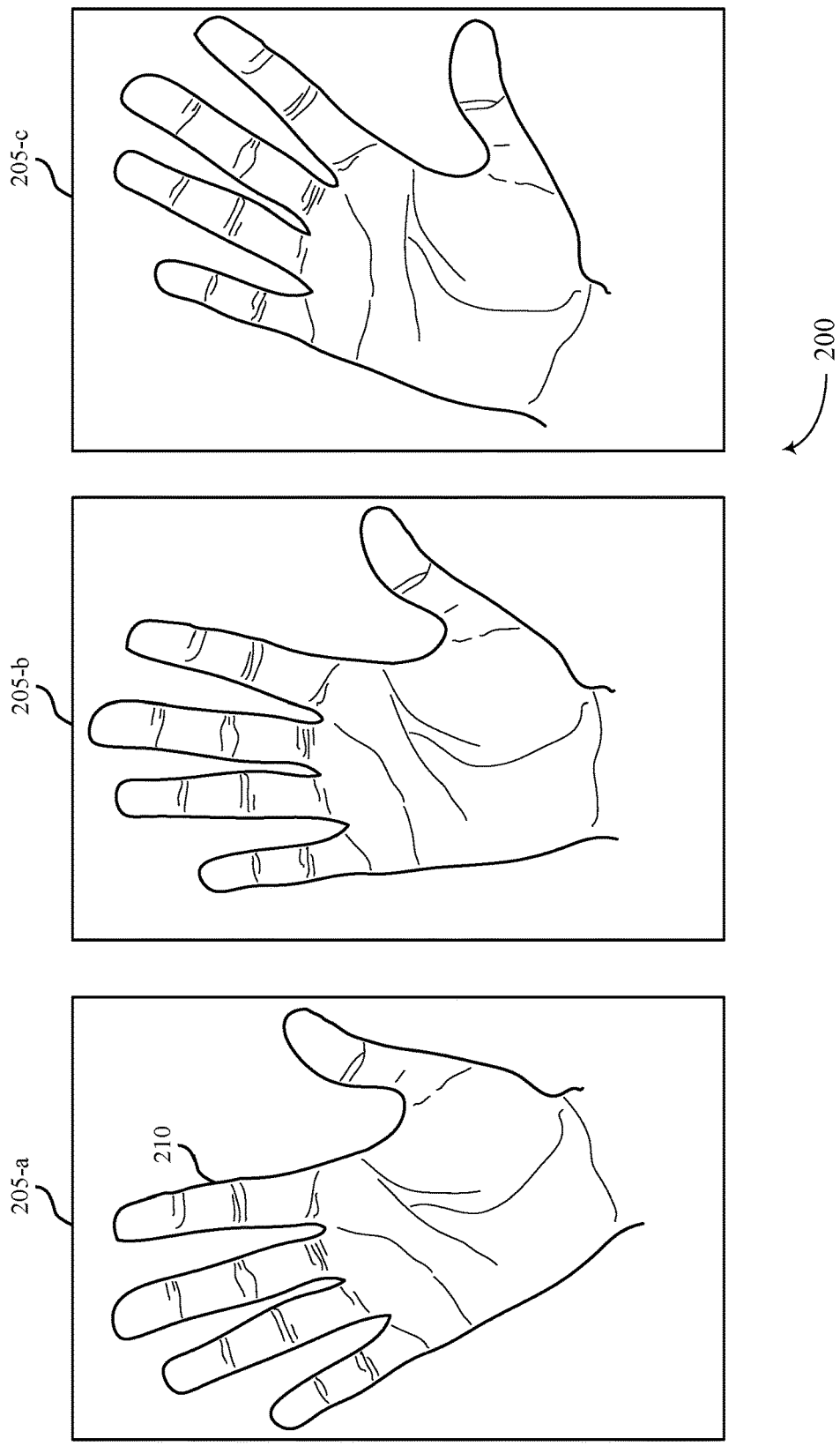
FIG. 2 illustrates an example of a multi-component gesture that supports frame rate adjustment for gesture detection in accordance with aspects of the present disclosure.

FIG. 2 illustrates an example of a multi-component gesture 200 that supports frame rate adjustment for gesture detection in accordance with aspects of the present disclosure. For example, multi-component gesture 200 may be captured within several or as part of (e.g., three, ten, more than ten) distinct image frames 205. The image frames 205 may be part of a sequence of frames captured by an image sensor (e.g., sensor(s) 116) or a sampling of a sequence of consecutive frames (e.g., every third frame, every tenth frame). As used herein, the term "frame" or "image frame" may encompass any unit of any suitable computer vision technique. For example, the "frame" or "image frame" may be a synthetic composite model of an image, such as might be used in an event based sensor, among other examples.

The first image frame 205-*a* may be captured within a first time window that commences upon the performance of some device function (e.g., in accordance with a scheduled device function, based on some active user input, based on some environmental condition such as temperature or light intensity). The second image frame 205-*b* may be captured within a second time window following the capture of the first image frame 205-*a*. The third image frame 205-*c* may be captured within a third time window following the capture of the second image frame 205-*b*. The respective time windows between different frames may have the same duration or different durations. As an example, the first time window may have a duration of five seconds, and the second and third time windows may have durations of one second. It will be further understood that the time window durations may also be expressed in terms of a number of captured frames rather than a unit of time.

A human observer of the image frames 205 would understand them to be images of the palm side of a human hand. In the first image frame 205-*a*, the hand is tilted slightly left, in the second image frame 205-*b*, the hand is straight up and down, and in the third image frame 205-*c*, the hand is tilted slightly to the right. A human observer may interpret the image frames 205 as a multi-component gesture, in particular, a wave of a hand.

In accordance with aspects of the disclosure, a device may be configured to recognize a particular multi-component gesture (e.g., the wave of the hand) and interpret the recognized gesture. For example, the wave of the hand may be interpreted as positive feedback or any other type of feedback. In some examples, the device may be configured to recognize a plurality of different gestures, which may include or be multi-component gestures, and distinguish among them. The different multi-component gestures may be interpreted as signaling different types of feedback, calls to initiate certain actions, etc.

A device such as a UE 115 may be configured to detect a particular recognizable object in an image frame using object models. The device may detect a match between the contents of a particular image frame and a particular object model by processing the image frame to detect an object similar to the object model. In the example depicted in FIG. 2, the first object model may be a hand shape that is tilted by −15 degrees, and the device may determine, based on a comparison of first gesture object 210 to the first object model, that the first image frame 205-*a* includes an object corresponding to the first object model.

The determination that the first image frame 205-*a* includes an object corresponding to the first object model may trigger performance of one or more additional functions. For example, in response to a determination that the first image frame 205-*a* includes an object corresponding to the first object model, the device system may attempt to detect, during each image frame 205 in a subsequent time window, an object corresponding to a second object model.

In accordance with aspects of the present disclosure, a device may be configured (e.g., preconfigured, semi statically configured, dynamically configured with gestures and/or have additional gestures added) with a set of multi-component gestures. For example, each multi-component gesture may be recognized based on an ordered combination of object models. In some cases, each component of each multi-component gesture may be associated with a given frame rate. As an example, a device may recognize an eye blink as a multi-component gesture. Upon detecting an open eye in a first image frame 205 (e.g., based on an open eye object model) at a relatively low frame rate, the device may increase the frame rate to attempt to capture a closed eye in a second plurality of image frames 205.

Although the multi-component gesture depicted in FIG. 2 includes a sequence of three object models, it will be understood that only two object models may be used in some cases for a multi-component gesture. Moreover, the sequence could include any number of object models, for example, six object models, sixty object models, or six hundred object models. It is not necessary that the gesture objects in different image frames 205 be the same object. For example, image frame 205-*c* may contain a face instead of a hand. Similarly, it is not necessary that the different object models have the same shape (for example, the shape of an open hand as depicted in FIG. 2 compared to a closed fist, a head, etc.).

In some cases, a device may detect one of a small number of recognizable objects in a given image frame 205, record the result of the detection, and move on to the next image frame 205 in search of another recognizable object. In some examples, the device may discard any image frame 205 in which no recognizable object is detected. In some cases, the device may analyze a portion of each image frame 205 (e.g., a central portion of pixels, a corner of the image frame 205). The power cost of detecting one of a small set of objects in an image frame 205 may be relatively small compared to the power cost of tracking the detected object as it changes position or orientation.

Figure 3:
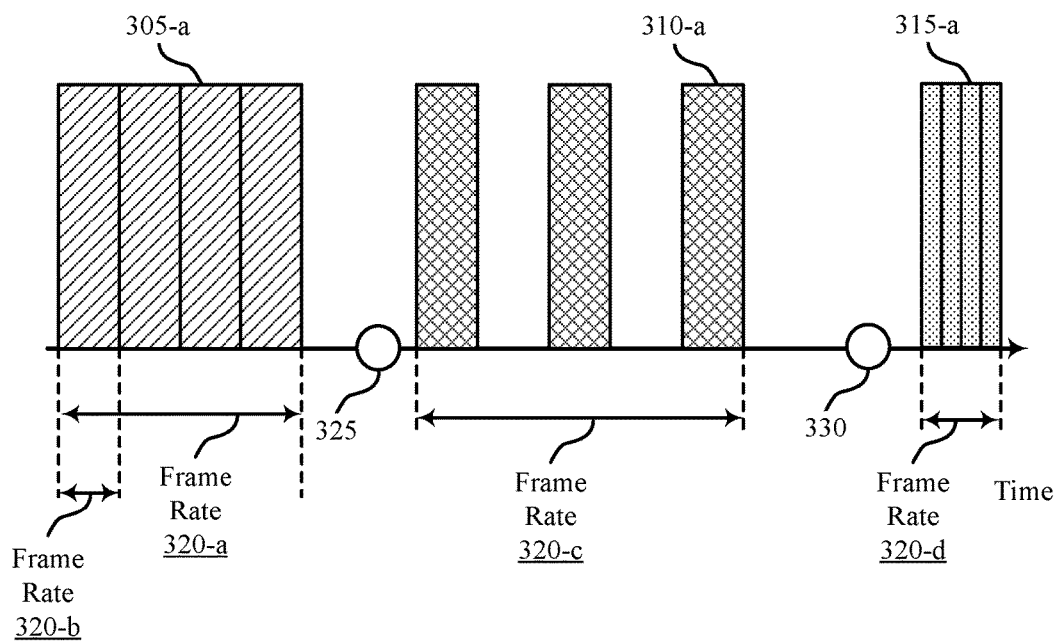
FIG. 3 illustrates an example of a timing diagram that supports frame rate adjustment for gesture detection in accordance with aspects of the present disclosure.

FIG. 3 illustrates an example of a timing diagram 300 that supports frame rate adjustment for gesture detection in accordance with aspects of the present disclosure. Timing diagram 300 may be performed by a device (e.g., a UE 115 or an AP 105) and may illustrate aspects of the techniques described with reference to multi-component gesture 200.

A device may capture a first set of images 305 according to a frame rate 320-*a*. It is to be understood that a frame rate 320 may refer to an amount of time to capture a number of images, an amount of time to capture a single frame (e.g., as illustrated by frame rate 320-*b*), or a combination thereof without deviating from the scope of the present disclosure, among other examples or alternatives. The device may in some cases detect a gesture object corresponding to a first object model in image 305-*a*. The device may identify a subset of configured gestures that include the detected gesture object. For example, if the gesture object is a hand in a vertical position, the device may select the subset to include only gestures including that gesture object.

At 325, the device may update a frame rate based on the subset of configured gestures. For example, frame rate 320-*c* may be selected to allow for detection of any subsequent gesture object in the subset of configured gestures. In the present example, the device may detect a second gesture object corresponding to a second object model in image 310-*a* (e.g., within a second set of images 310 captured according to frame rate 320-*c*). The device may then further refine the set of active (e.g., potentially valid) configured gestures that include both detected gesture objects. That is, the device may ignore any configured gestures that do not include the first gesture object or the second gesture object when determining a subsequent frame rate.

At 330, the device may update a frame rate based on the gesture state (e.g., based on the refined set of active configured gestures). For example, frame rate 320-*d* may be selected so as to allow for detection of any subsequent gesture object in the remaining active gestures. The device may then detect a third gesture object corresponding to a third object model in image 315-*a* (e.g., within a third set of images 315 captured according to frame rate 320-*d*), and so on. It is to be understood that timing diagram 300 is included for the sake of explanation and is not limiting of scope. For example, more than three gestures may be included in the multi-component gesture, different numbers of images may be capture in the various image sets, etc.

Figure 4:
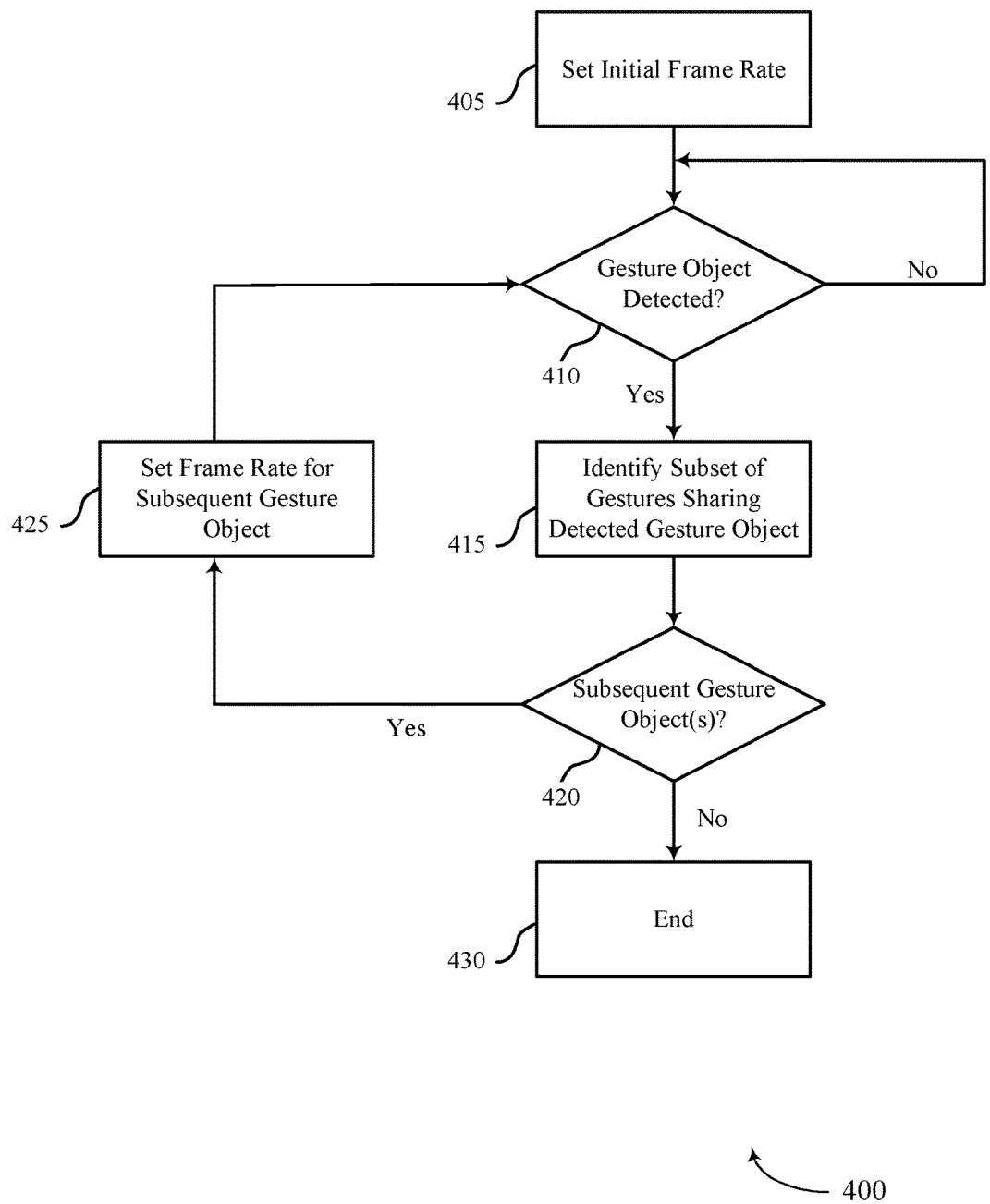
FIG. 4 illustrates an example of a process flow that supports frame rate adjustment for gesture detection in accordance with aspects of the present disclosure.

FIG. 4 illustrates an example of a process flow 400 that supports frame rate adjustment for gesture detection in accordance with aspects of the present disclosure. Process flow 400 may be performed by a device (e.g., a UE 115 or an AP 105) and may illustrate aspects of the techniques described with reference to multi-component gesture 200 and timing diagram 300.

At 405, the device may set an initial frame rate for one or more sensors of the device. For example, the initial frame rate may be based on respective frame rates for each of a set of gestures. The device may be configured (e.g., trained based on a set of training images or otherwise configured) to recognize each gesture in the set of gestures. One or more of the configured gestures may be an example of a multi-component gesture as described with reference to FIG. 2. Each gesture may therefore have a frame rate associated with a first object (e.g., a first component) of the gesture, where the frame rate may represent the minimum frame rate required to detect the given object. For example, if there are N gestures configured, the initial frame rate may be based on the minimum frame rates for each of the N gestures (e.g., the initial frame rate may be the maximum of the minimum frame rates). Techniques for selecting an initial frame rate other than selecting a maximum are considered (e.g., weighted combinations of minimum frame rates and the like).

At 410, the device may determine whether a gesture object for any of the configured gestures is detected in a given set of images. If the gesture object is not detected, the device may continue obtaining images according to the frame rate determined at 405. If the gesture object is detected, the device may identify at least a subset of gestures sharing the detected gesture object at 415.

At 420, the device may determine whether there are any subsequent gesture objects. If there are not, the device may update one or more operational parameters at 430 based on the detected gesture. If remaining gesture objects remain, the device may set a frame rate for detection of the subsequent gesture object(s) at 425. For example, the frame rate may be set similarly to the initial frame rate (e.g., based on a remaining active set of gesture candidates). If the device determines that the gesture object detected at 410 is unique to a single configured gesture, the frame rate may be set according to the minimum frame rate for the next gesture object of the single remaining active gesture at 425.

Figure 5:
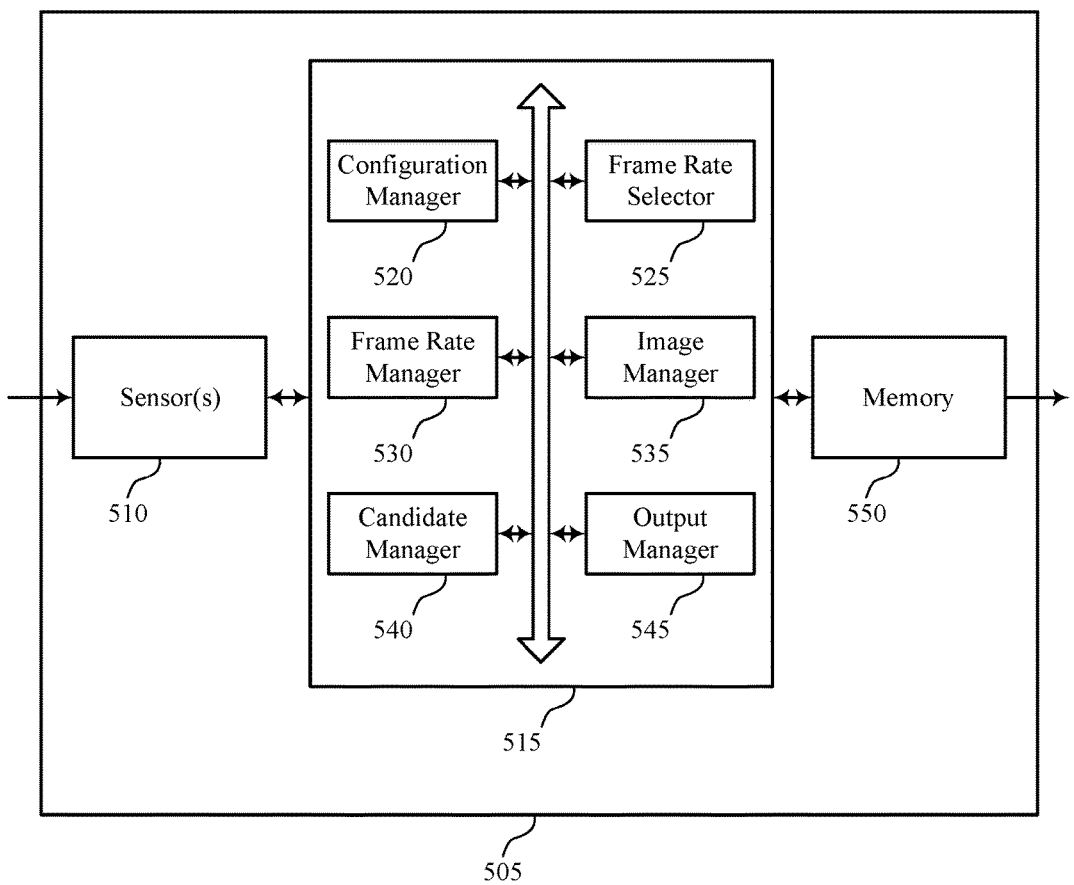
FIG. 5 shows a block diagram of a device that supports frame rate adjustment for gesture detection in accordance with aspects of the present disclosure.

FIG. 5 shows a block diagram 500 of a device 505 that supports frame rate adjustment for gesture detection in accordance with aspects of the present disclosure. The device 505 may be an example of aspects of a wireless device (e.g., an AP 105 or a UE 115) as described herein. The device 505 may include sensor(s) 510, a gesture detection manager 515, and memory 550. The device 505 may also include a processor. Each of these components may be in communication with one another (e.g., via one or more buses). The gesture detection manager 515 may include a configuration manager 520, a frame rate selector 525, a frame rate manager 530, an image manager 535, a candidate manager 540, and an output manager 545. Each of these modules may communicate, directly or indirectly, with one another (e.g., via one or more buses). The gesture detection manager 515 may be an example of aspects of the gesture detection manager 610 or the gesture detection manager 117 described herein.

The gesture detection manager 515, or its sub-components, may be implemented in hardware, code (e.g., software or firmware) executed by a processor, or any combination thereof. If implemented in code executed by a processor, the functions of the gesture detection manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The gesture detection manager 515, or its sub-components, may be physically located at various positions, including being distributed such that portions of functions are implemented at different physical locations by one or more physical components. In some examples, the gesture detection manager 515, or its sub-components, may be a separate and distinct component in accordance with various aspects of the present disclosure. In some examples, the gesture detection manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Sensor 510 may include or be an example of a digital imaging sensor for taking photos and video. In some examples, sensor 510 may receive information such as packets, user data, or control information associated with various information channels (e.g., from a transceiver 620 described with reference to FIG. 6). Information may be passed on to other components of the device. In some cases, sensor 510 may represent a single physical sensor or an array of sensors. The sensor 510 (e.g., or array of sensors 510) may capture a plurality of images, where each sensor 510 (e.g., or a subset of the sensors 510) operates according to a frame rate indicated by the gesture detection manager 515.

The configuration manager 520 may identify a set of configured gestures. In some examples, the configuration manager 520 may receive one or more training images for each gesture of the set of configured gestures. In some examples, the configuration manager 520 may identify respective gesture objects for each gesture based on the corresponding one or more training images.

The frame rate selector 525 may determine a set of minimum frame rates, where each minimum frame rate corresponds to at least one configured gesture in the set of configured gestures. In some examples, the frame rate selector 525 may determine a maximum frame rate from the set of minimum frame rates, where setting the initial frame rate includes setting the initial frame rate to be equal to the maximum frame rate. In some cases, the frame rate selector 525 may set the initial frame rate to be greater than the maximum frame rate (e.g., five percent greater, ten frames-per-second greater). For example, setting the initial frame rate to be greater than the maximum frame rate (e.g., within some configurable distance of the maximum frame rate) may allow the device to improve reliability of gesture detection.

Similarly, the frame rate selector 525 may set the initial frame rate to be less than the maximum frame rate (e.g., five percent smaller, ten frames-per-second smaller). For example, setting the initial frame rate to be less than the maximum frame rate (e.g., within some configurable distance of the maximum frame rate) may allow the device to reduce power consumption. In some examples, the frame rate selector 525 may determine a second set of minimum frame rates that correspond to second gesture objects of the subset of the set of configured gestures. In some examples, the frame rate selector 525 may determine a second minimum frame rate that corresponds to a second gesture object of the unique gesture.

The frame rate manager 530 may set an initial frame rate for a sensor of the device based on the set of minimum frame rates. In some examples, the frame rate manager 530 may set a second frame rate for the sensor of the device based on the second set of minimum frame rates. In some examples, the frame rate manager 530 may set a second frame rate for the sensor of the device based on the second minimum frame rate.

The image manager 535 may capture a set of images using the initial frame rate. In some examples, the image manager 535 may capture a second set of images using the second frame rate, where detecting the configured gesture is based on the second set of images. In some examples, the image manager 535 may identify a portion of each of the second set of images based on the one or more characteristics of the second gesture object. In some examples, the image manager 535 may identify a presence of the second gesture object in at least one of the second set of images by analyzing the portion of the at least one of the second set of images, where detecting the configured gesture is based on the presence of the second gesture object.

The candidate manager 540 may detect a configured gesture of the set of configured gestures based on the set of images. In some examples, the candidate manager 540 may detect a first gesture object based on the set of images. In some examples, the candidate manager 540 may identify a subset of the set of configured gestures that share the first gesture object. In some examples, the candidate manager 540 may identify a unique gesture of the set of configured gestures that includes the first gesture object. In some examples, the candidate manager 540 may estimate one or more characteristics of a second gesture object corresponding to the unique gesture, where the one or more characteristics include an object size of the second gesture object, an object position of the second gesture object, or both.

The output manager 545 may update an operational parameter of the device based on detecting the configured gesture. In some examples, the output manager 545 may unlock the device based on detecting the configured gesture, may provide an input for a processor of the device based on detecting the configured gesture, or both.

Memory 550 may comprise one or more computer-readable storage media. Examples of memory 550 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor.

Figure 6:
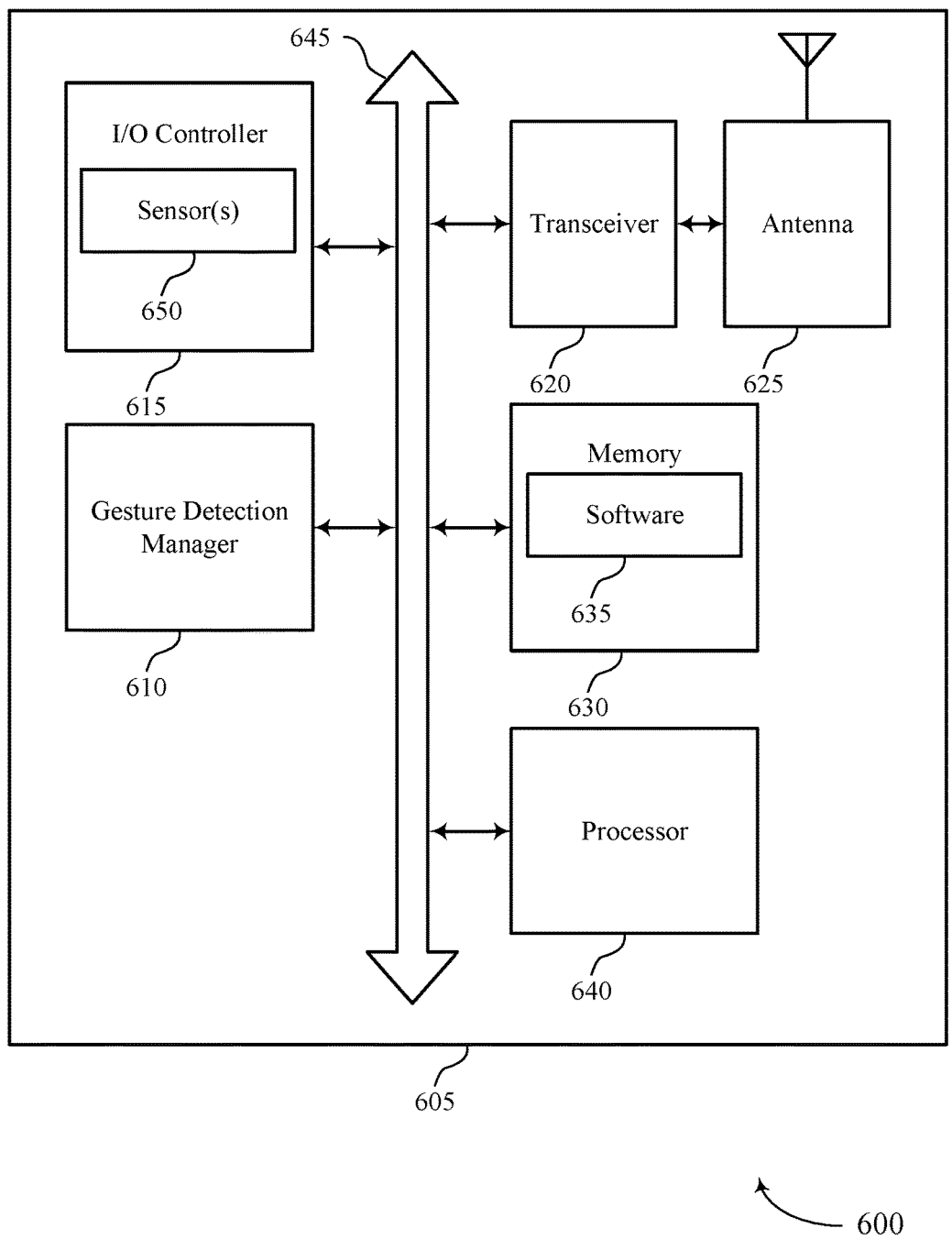
FIG. 6 shows a diagram of a system including a device that supports frame rate adjustment for gesture detection in accordance with aspects of the present disclosure.

FIG. 6 shows a diagram of a system 600 including a device 605 that supports frame rate adjustment for gesture detection in accordance with aspects of the present disclosure. The device 605 may be an example of or include the components of device 505, an AP 105, or a UE 115 as described herein. The device 605 may include components for bi-directional voice and data communications including components for transmitting and receiving communications, including a gesture detection manager 610, an I/O controller 615, a transceiver 620, an antenna 625, memory 630, and a processor 640. These components may be in electronic communication via one or more buses (e.g., bus 645).

The gesture detection manager 610 may identify a set of configured gestures. The gesture detection manager 610 may determine a set of minimum frame rates, where each minimum frame rate corresponds to at least one configured gesture in the set of configured gestures. The gesture detection manager 610 may set an initial frame rate for a sensor of the device based on the set of minimum frame rates. The gesture detection manager 610 may capture a set of images using the initial frame rate. The gesture detection manager 610 may detect a configured gesture of the set of configured gestures based on the set of images.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615. In some cases, I/O controller 615 may be or include sensor 650. Sensor 650 may be an example of a digital imaging sensor for taking photos and video.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the wireless device may include a single antenna 625. However, in some cases the device may have more than one antenna 625, which may be capable of concurrently transmitting or receiving multiple wireless transmissions.

Memory 630 may comprise one or more computer-readable storage media. Examples of memory 630 include, but are not limited to, a RAM, SRAM, DRAM, ROM, EEPROM, CD-ROM or other optical disc storage, magnetic disc storage, or other magnetic storage devices, flash memory, or any other medium that can be used to store desired program code in the form of instructions or data structures and that can be accessed by a computer or a processor.

Memory 630 may store program modules and/or instructions that are accessible for execution by image processing controller 610. That is, memory 630 may store computer-readable, computer-executable software 635 including instructions that, when executed, cause the processor to perform various functions described herein. In some cases, the memory 630 may contain, among other things, a basic input/output system (BIOS) which may control basic hardware or software operation such as the interaction with peripheral components or devices. The software 635 may include code to implement aspects of the present disclosure, including code to support multi-context real time inline image signal processing. Software 635 may be stored in a non-transitory computer-readable medium such as system memory or other memory. In some cases, the software 635 may not be directly executable by the processor but may cause a computer (e.g., when compiled and executed) to perform functions described herein.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting frame rate adjustment for gesture detection).

Figure 7:
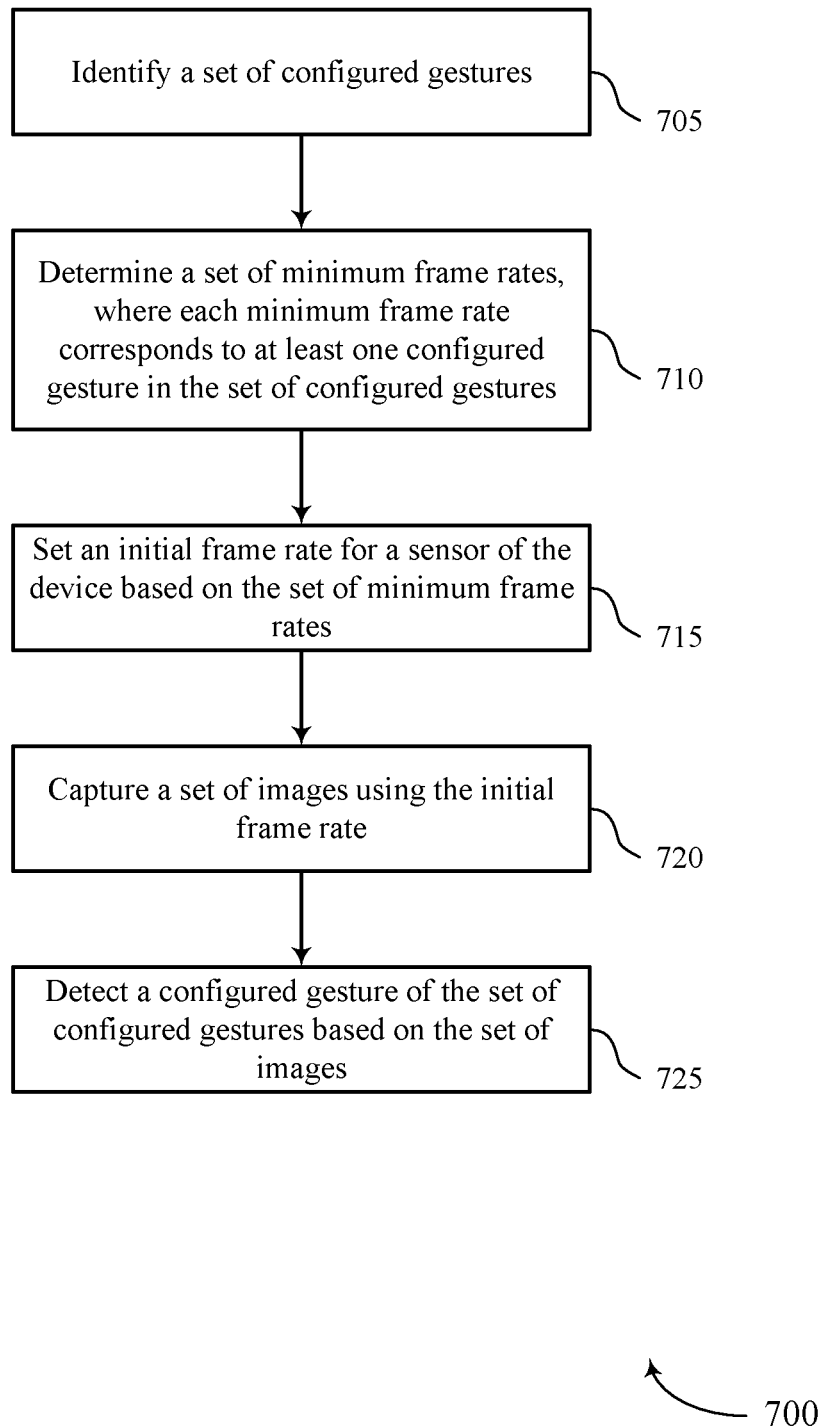
FIGS. 7 through 10 show flowcharts illustrating methods that support frame rate adjustment for gesture detection in accordance with aspects of the present disclosure.

FIG. 7 shows a flowchart illustrating a method 700 that supports frame rate adjustment for gesture detection in accordance with aspects of the present disclosure. The operations of method 700 may be implemented by a device or its components as described herein. For example, the operations of method 700 may be performed by a gesture detection manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 705, the device may identify a set of configured gestures. The operations of 705 may be performed according to the methods described herein. In some examples, aspects of the operations of 705 may be performed by a configuration manager as described with reference to FIGS. 5 and 6.

At 710, the device may determine a set of minimum frame rates, where each minimum frame rate corresponds to at least one configured gesture in the set of configured gestures. The operations of 710 may be performed according to the methods described herein. In some examples, aspects of the operations of 710 may be performed by a frame rate selector as described with reference to FIGS. 5 and 6.

At 715, the device may set an initial frame rate for a sensor of the device based on the set of minimum frame rates. The operations of 715 may be performed according to the methods described herein. In some examples, aspects of the operations of 715 may be performed by a frame rate manager as described with reference to FIGS. 5 and 6.

At 720, the device may capture a set of images using the initial frame rate. The operations of 720 may be performed according to the methods described herein. In some examples, aspects of the operations of 720 may be performed by an image manager as described with reference to FIGS. 5 and 6.

At 725, the device may detect a configured gesture of the set of configured gestures based on the set of images. The operations of 725 may be performed according to the methods described herein. In some examples, aspects of the operations of 725 may be performed by a candidate manager as described with reference to FIGS. 5 and 6.

Figure 8:
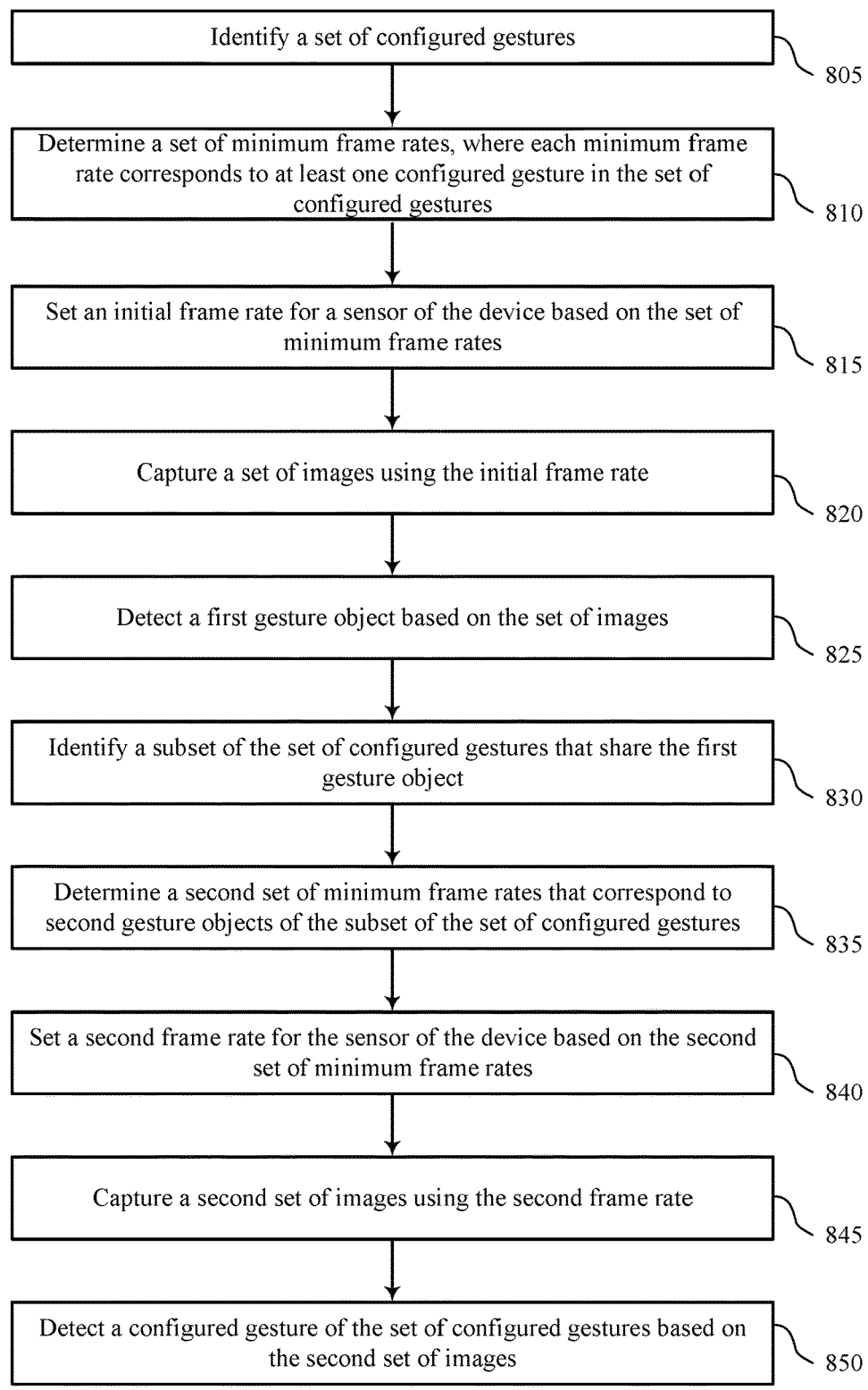

FIG. 8 shows a flowchart illustrating a method 800 that supports frame rate adjustment for gesture detection in accordance with aspects of the present disclosure. The operations of method 800 may be implemented by a device or its components as described herein. For example, the operations of method 800 may be performed by a gesture detection manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 805, the device may identify a set of configured gestures. The operations of 805 may be performed according to the methods described herein. In some examples, aspects of the operations of 805 may be performed by a configuration manager as described with reference to FIGS. 5 and 6.

At 810, the device may determine a set of minimum frame rates, where each minimum frame rate corresponds to at least one configured gesture in the set of configured gestures. The operations of 810 may be performed according to the methods described herein. In some examples, aspects of the operations of 810 may be performed by a frame rate selector as described with reference to FIG. 5.

At 815, the device may set an initial frame rate for a sensor of the device based on the set of minimum frame rates. The operations of 815 may be performed according to the methods described herein. In some examples, aspects of the operations of 815 may be performed by a frame rate manager as described with reference to FIG. 5.

At 820, the device may capture a set of images using the initial frame rate. The operations of 820 may be performed according to the methods described herein. In some examples, aspects of the operations of 820 may be performed by an image manager as described with reference to FIG. 5.

At 825, the device may detect a first gesture object based on the set of images. The operations of 825 may be performed according to the methods described herein. In some examples, aspects of the operations of 825 may be performed by a candidate manager as described with reference to FIG. 5.

At 830, the device may identify a subset of the set of configured gestures that share the first gesture object. The operations of 830 may be performed according to the methods described herein. In some examples, aspects of the operations of 830 may be performed by a candidate manager as described with reference to FIG. 5.

At 835, the device may determine a second set of minimum frame rates that correspond to second gesture objects of the subset of the set of configured gestures. The operations of 835 may be performed according to the methods described herein. In some examples, aspects of the operations of 835 may be performed by a frame rate selector as described with reference to FIG. 5.

At 840, the device may set a second frame rate for the sensor of the device based on the second set of minimum frame rates. The operations of 840 may be performed according to the methods described herein. In some examples, aspects of the operations of 840 may be performed by a frame rate manager as described with reference to FIG. 5.

At 845, the device may capture a second set of images using the second frame rate. The operations of 845 may be performed according to the methods described herein. In some examples, aspects of the operations of 845 may be performed by an image manager as described with reference to FIG. 5.

At 850, the device may detect a configured gesture of the set of configured gestures based on the second set of images. The operations of 850 may be performed according to the methods described herein. In some examples, aspects of the operations of 850 may be performed by a candidate manager as described with reference to FIG. 5.

Figure 9:
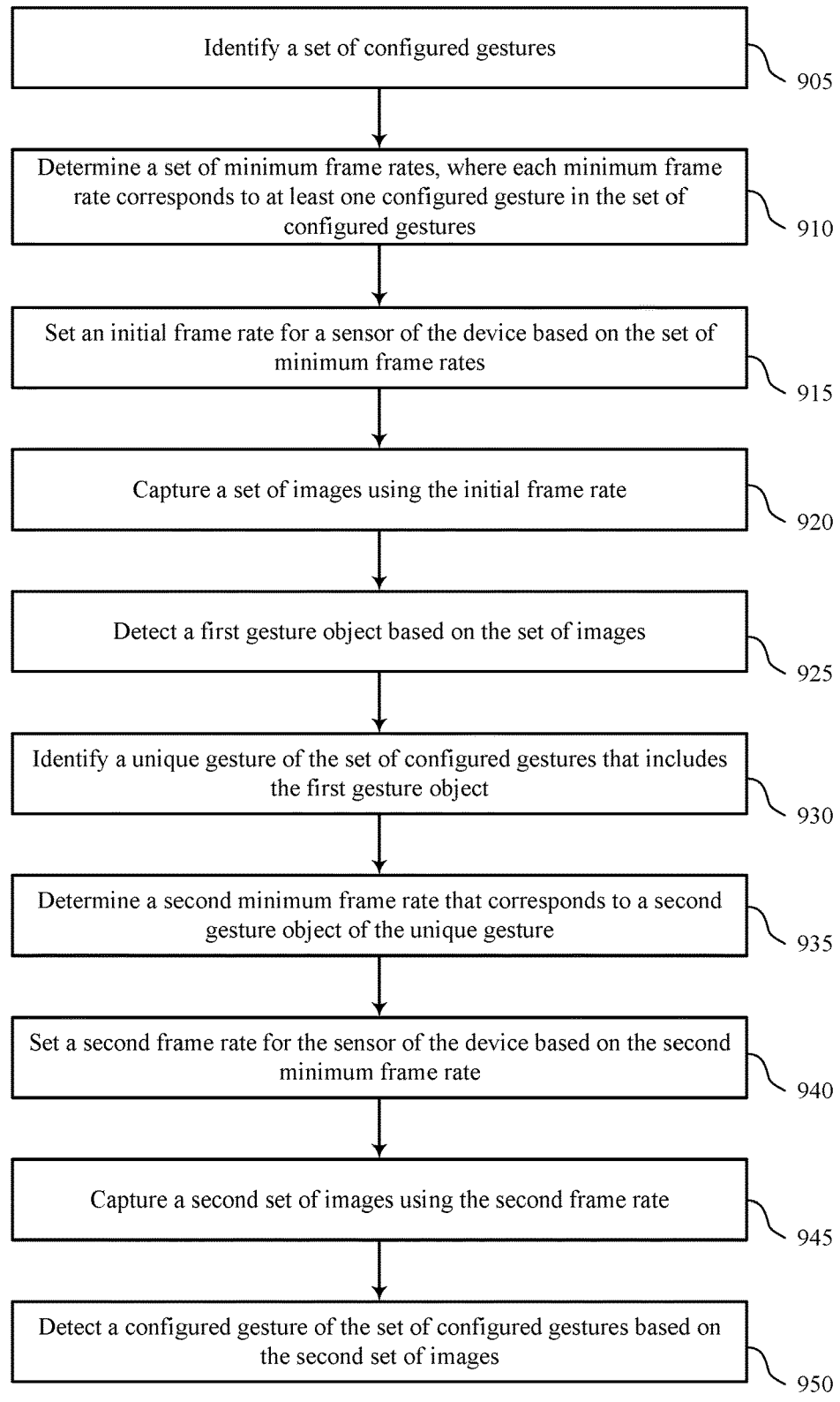

FIG. 9 shows a flowchart illustrating a method 900 that supports frame rate adjustment for gesture detection in accordance with aspects of the present disclosure. The operations of method 900 may be implemented by a device or its components as described herein. For example, the operations of method 900 may be performed by a gesture detection manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 905, the device may identify a set of configured gestures. The operations of 905 may be performed according to the methods described herein. In some examples, aspects of the operations of 905 may be performed by a configuration manager as described with reference to FIG. 5.

At 910, the device may determine a set of minimum frame rates, where each minimum frame rate corresponds to at least one configured gesture in the set of configured gestures. The operations of 910 may be performed according to the methods described herein. In some examples, aspects of the operations of 910 may be performed by a frame rate selector as described with reference to FIG. 5.

At 915, the device may set an initial frame rate for a sensor of the device based on the set of minimum frame rates. The operations of 915 may be performed according to the methods described herein. In some examples, aspects of the operations of 915 may be performed by a frame rate manager as described with reference to FIG. 5.

At 920, the device may capture a set of images using the initial frame rate. The operations of 920 may be performed according to the methods described herein. In some examples, aspects of the operations of 920 may be performed by an image manager as described with reference to FIG. 5.

At 925, the device may detect a first gesture object based on the set of images. The operations of 925 may be performed according to the methods described herein. In some examples, aspects of the operations of 925 may be performed by a candidate manager as described with reference to FIG. 5.

At 930, the device may identify a unique gesture of the set of configured gestures that includes the first gesture object. The operations of 930 may be performed according to the methods described herein. In some examples, aspects of the operations of 930 may be performed by a candidate manager as described with reference to FIG. 5.

At 935, the device may determine a second minimum frame rate that corresponds to a second gesture object of the unique gesture. The operations of 935 may be performed according to the methods described herein. In some examples, aspects of the operations of 935 may be performed by a frame rate selector as described with reference to FIG. 5.

At 940, the device may set a second frame rate for the sensor of the device based on the second minimum frame rate. The operations of 940 may be performed according to the methods described herein. In some examples, aspects of the operations of 940 may be performed by a frame rate manager as described with reference to FIG. 5.

At 945, the device may capture a second set of images using the second frame rate. The operations of 945 may be performed according to the methods described herein. In some examples, aspects of the operations of 945 may be performed by an image manager as described with reference to FIG. 5.

At 950, the device may detect a configured gesture of the set of configured gestures based on the second set of images. The operations of 950 may be performed according to the methods described herein. In some examples, aspects of the operations of 950 may be performed by a candidate manager as described with reference to FIG. 5.

Figure 10:
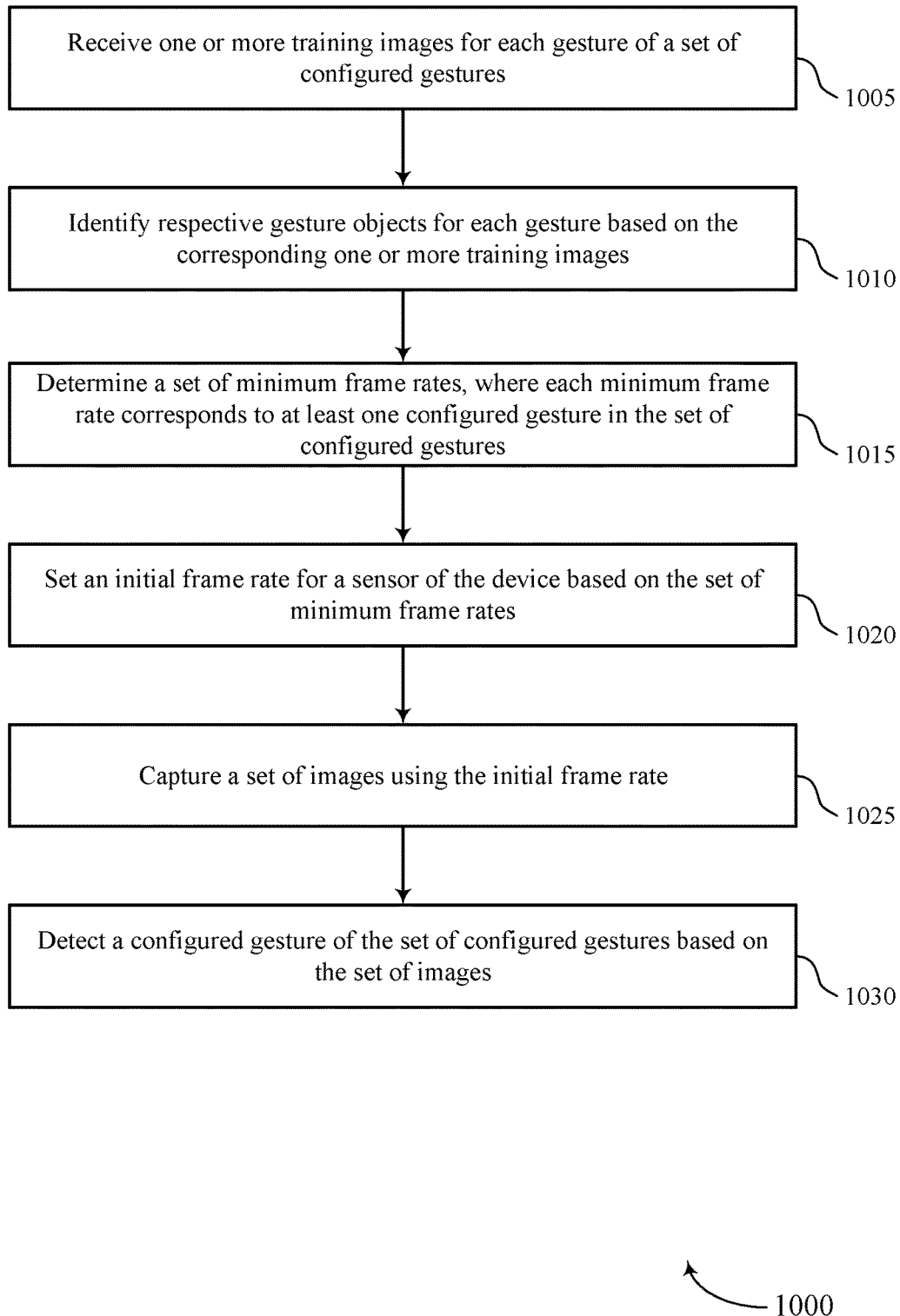

FIG. 10 shows a flowchart illustrating a method 1000 that supports frame rate adjustment for gesture detection in accordance with aspects of the present disclosure. The operations of method 1000 may be implemented by a device or its components as described herein. For example, the operations of method 1000 may be performed by a gesture detection manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 1005, the device may receive one or more training images for each gesture of a set of configured gestures. The operations of 1005 may be performed according to the methods described herein. In some examples, aspects of the operations of 1005 may be performed by a configuration manager as described with reference to FIG. 5.

At 1010, the device may identify respective gesture objects for each gesture based on the corresponding one or more training images. The operations of 1010 may be performed according to the methods described herein. In some examples, aspects of the operations of 1010 may be performed by a configuration manager as described with reference to FIG. 5.

At 1015, the device may determine a set of minimum frame rates, where each minimum frame rate corresponds to at least one configured gesture in the set of configured gestures. The operations of 1015 may be performed according to the methods described herein. In some examples, aspects of the operations of 1015 may be performed by a frame rate selector as described with reference to FIG. 5.

At 1020, the device may set an initial frame rate for a sensor of the device based on the set of minimum frame rates. The operations of 1020 may be performed according to the methods described herein. In some examples, aspects of the operations of 1020 may be performed by a frame rate manager as described with reference to FIG. 5.

At 1025, the device may capture a set of images using the initial frame rate. The operations of 1025 may be performed according to the methods described herein. In some examples, aspects of the operations of 1025 may be performed by an image manager as described with reference to FIG. 5.

At 1030, the device may detect a configured gesture of the set of configured gestures based on the set of images. The operations of 1030 may be performed according to the methods described herein. In some examples, aspects of the operations of 1030 may be performed by a candidate manager as described with reference to FIG. 5.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for gesture detection at a device, comprising:
identifying a set of configured gestures;
determining a set of minimum frame rates, wherein each minimum frame rate corresponds to at least one configured gesture in the set of configured gestures;
setting an initial frame rate for a sensor of the device based at least in part on the set of minimum frame rates;
capturing a plurality of images using the initial frame rate; and
detecting a configured gesture of the set of configured gestures based at least in part on the plurality of images.

2. The method of claim 1, further comprising:
determining a maximum frame rate from the set of minimum frame rates, wherein setting the initial frame rate comprises setting the initial frame rate to be equal to the maximum frame rate.

3. The method of claim 1, further comprising:
detecting a first gesture object based at least in part on the plurality of images;
identifying a subset of the set of configured gestures that share the first gesture object;
determining a second set of minimum frame rates that correspond to second gesture objects of the subset of the set of configured gestures;
setting a second frame rate for the sensor of the device based at least in part on the second set of minimum frame rates; and
capturing a second plurality of images using the second frame rate, wherein detecting the configured gesture is based at least in part on the second plurality of images.

4. The method of claim 1, further comprising:
detecting a first gesture object based at least in part on the plurality of images;
identifying a unique gesture of the set of configured gestures that comprises the first gesture object;
determining a second minimum frame rate that corresponds to a second gesture object of the unique gesture;
setting a second frame rate for the sensor of the device based at least in part on the second minimum frame rate; and
capturing a second plurality of images using the second frame rate, wherein detecting the configured gesture is based at least in part on the second plurality of images.

5. The method of claim 4, further comprising:
estimating one or more characteristics of a second gesture object corresponding to the unique gesture, wherein the one or more characteristics include an object size of the second gesture object, an object position of the second gesture object, or both;
identifying a portion of each of the second plurality of images based at least in part on the one or more characteristics of the second gesture object; and
identifying a presence of the second gesture object in at least one of the second plurality of images by analyzing the portion of the at least one of the second plurality of images, wherein detecting the configured gesture is based at least in part on the presence of the second gesture object.

6. The method of claim 1, wherein identifying the set of configured gestures comprises:
receiving one or more training images for each gesture of the set of configured gestures; and
identifying respective gesture objects for each gesture based at least in part on the corresponding one or more training images.

7. The method of claim 1, further comprising:
updating an operational parameter of the device based at least in part on detecting the configured gesture.

8. The method of claim 7, wherein updating the operational parameter comprises:
unlocking the device based at least in part on detecting the configured gesture;
providing an input for a processor of the device based at least in part on detecting the configured gesture; or; and both.

9. An apparatus for gesture detection, comprising:
a processor,
memory in electronic communication with the processor; and
instructions stored in the memory and executable by the processor to cause the apparatus to:
identify a set of configured gestures;
determine a set of minimum frame rates, wherein each minimum frame rate corresponds to at least one configured gesture in the set of configured gestures;
set an initial frame rate for a sensor based at least in part on the set of minimum frame rates;
capture a plurality of images using the initial frame rate; and
detect a configured gesture of the set of configured gestures based at least in part on the plurality of images.

10. The apparatus of claim 9, wherein the instructions are further executable by the processor to cause the apparatus to:
determine a maximum frame rate from the set of minimum frame rates, wherein setting the initial frame rate are executable by the processor to cause the apparatus to set the initial frame rate to be equal to the maximum frame rate.

11. The apparatus of claim 9, wherein the instructions are further executable by the processor to cause the apparatus to:
detect a first gesture object based at least in part on the plurality of images;
identify a subset of the set of configured gestures that share the first gesture object;
determine a second set of minimum frame rates that correspond to second gesture objects of the subset of the set of configured gestures;
set a second frame rate for the sensor of the apparatus based at least in part on the second set of minimum frame rates; and
capture a second plurality of images using the second frame rate, wherein detecting the configured gesture is based at least in part on the second plurality of images.

12. The apparatus of claim 9, wherein the instructions are further executable by the processor to cause the apparatus to:
detect a first gesture object based at least in part on the plurality of images;
identify a unique gesture of the set of configured gestures that comprises the first gesture object;
determine a second minimum frame rate that corresponds to a second gesture object of the unique gesture;
set a second frame rate for the sensor of the apparatus based at least in part on the second minimum frame rate; and
capture a second plurality of images using the second frame rate, wherein detecting the configured gesture is based at least in part on the second plurality of images.

13. The apparatus of claim 12, wherein the instructions are further executable by the processor to cause the apparatus to:
estimate one or more characteristics of a second gesture object corresponding to the unique gesture, wherein the one or more characteristics include an object size of the second gesture object, an object position of the second gesture object, or both;
identify a portion of each of the second plurality of images based at least in part on the one or more characteristics of the second gesture object; and
identify a presence of the second gesture object in at least one of the second plurality of images by analyzing the portion of the at least one of the second plurality of images, wherein detecting the configured gesture is based at least in part on the presence of the second gesture object.

14. The apparatus of claim 9, wherein the instructions to identify the set of configured gestures are executable by the processor to cause the apparatus to:
receive one or more training images for each gesture of the set of configured gestures; and
identify respective gesture objects for each gesture based at least in part on the corresponding one or more training images.

15. The apparatus of claim 9, wherein the instructions are further executable by the processor to cause the apparatus to:
update an operational parameter of the apparatus based at least in part on detecting the configured gesture.

16. A non-transitory computer-readable medium storing code for gesture detection at a device, the code comprising instructions executable by a processor to:
identify a set of configured gestures;
determine a set of minimum frame rates, wherein each minimum frame rate corresponds to at least one configured gesture in the set of configured gestures;
set an initial frame rate for a sensor of the device based at least in part on the set of minimum frame rates;
capture a plurality of images using the initial frame rate; and
detect a configured gesture of the set of configured gestures based at least in part on the plurality of images.

17. The non-transitory computer-readable medium of claim 16, wherein the instructions are further executable to:
the instructions to determine a maximum frame rate from the set of minimum frame rates, wherein setting the initial frame rate are executable by the processor to cause the apparatus to set the initial frame rate to be equal to the maximum frame rate.

18. The non-transitory computer-readable medium of claim 16, wherein the instructions are further executable to:
detect a first gesture object based at least in part on the plurality of images;
identify a subset of the set of configured gestures that share the first gesture object;
determine a second set of minimum frame rates that correspond to second gesture objects of the subset of the set of configured gestures;
set a second frame rate for the sensor of the device based at least in part on the second set of minimum frame rates; and
capture a second plurality of images using the second frame rate, wherein detecting the configured gesture is based at least in part on the second plurality of images.

19. The non-transitory computer-readable medium of claim 16, wherein the instructions are further executable to:
detect a first gesture object based at least in part on the plurality of images;
identify a unique gesture of the set of configured gestures that comprises the first gesture object;

determine a second minimum frame rate that corresponds to a second gesture object of the unique gesture;

set a second frame rate for the sensor of the device based at least in part on the second minimum frame rate; and capture a second plurality of images using the second frame rate, wherein detecting the configured gesture is based at least in part on the second plurality of images.

20. The non-transitory computer-readable medium of claim 16, wherein the instructions to identify the set of configured gestures are executable to:

receive one or more training images for each gesture of the set of configured gestures; and identify respective gesture objects for each gesture based at least in part on the corresponding one or more training images.

* * * * *